United States Patent
Noga

(10) Patent No.: US 7,620,673 B2
(45) Date of Patent: Nov. 17, 2009

(54) COMPLIMENTARY DISCRETE FOURIER TRANSFORM PROCESSOR

(75) Inventor: Andrew J. Noga, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 876 days.

(21) Appl. No.: 11/370,375

(22) Filed: Mar. 7, 2006

(65) Prior Publication Data

US 2007/0067376 A1    Mar. 22, 2007

Related U.S. Application Data

(60) Provisional application No. 60/722,081, filed on Sep. 19, 2005.

(51) Int. Cl.
*G06F 17/10* (2006.01)
*G06F 17/17* (2006.01)
*G06F 17/14* (2006.01)

(52) U.S. Cl. .................... 708/300; 708/313; 708/405

(58) Field of Classification Search ............... 708/300, 708/321, 400, 403–405, 407
See application file for complete search history.

(56) References Cited

U.S. PATENT DOCUMENTS

| | | | | |
|---|---|---|---|---|
| 4,799,179 | A * | 1/1989 | Masson et al. | 708/313 |
| 6,757,395 | B1 * | 6/2004 | Fang et al. | 381/94.3 |
| 6,792,057 | B2 * | 9/2004 | Kabel et al. | 375/346 |
| 7,027,942 | B1 * | 4/2006 | Woodard et al. | 702/76 |
| 7,043,512 | B2 * | 5/2006 | Lee et al. | 708/300 |
| 7,095,781 | B1 * | 8/2006 | Hsu et al. | 375/224 |
| 7,227,902 | B2 * | 6/2007 | Hellberg | 375/259 |
| 7,290,021 | B2 * | 10/2007 | Gray | 708/300 |
| 7,372,907 | B2 * | 5/2008 | Munoz et al. | 375/260 |
| 2003/0033611 | A1 * | 2/2003 | Shapiro et al. | 725/136 |
| 2009/0177478 | A1 * | 7/2009 | Jax et al. | 704/500 |

OTHER PUBLICATIONS

Karp, T.; Fliege, N. J., "Modified DFT filter banks with perfect reconstruction," IEEE Transactions on Circuits and Systems II: Analog and Digital Signal Processing, vol. 46, No. 11, pp. 1404-1414, Nov 1999.*

Noga, A., "Complex Band-pass Filters for Analytic Signal Generation and their Application," In-House Technical Memorandum, AFRL-IF-RS-TM-2001-1, Jul. 2001.*

Zhou, D., "A Review Of Plyphase Filter Banks And Their Application," In-House Final Technical Report, AFRL-IF-RS-TR-2006-277, Sep. 2006.*

Swaminathan, K.; Vaidyanathan, P., "Theory and design of uniform DFT, parallel, quadrature mirror filter banks," IEEE Transactions on Circuits and Systems, vol. 33, No. 12, pp. 1170-1191, Dec 1986.*

* cited by examiner

*Primary Examiner*—Lewis A Bullock, Jr.
*Assistant Examiner*—Matthew Sandifer
(74) *Attorney, Agent, or Firm*—Joseph A. Mancini

(57) ABSTRACT

Method and apparatus for a complimentary discrete Fourier transform processor. An input signal is sampled, samples then being sequentially delayed, channelized, and processed. Synthesized outputs are provided in complimentary form. Channels are independent so as to allow for the application of gain, equalization and interference cancellation on a channel-by-channel basis. Both real and complex valued input signals may be processed. The invention optimizes computational efficiency.

23 Claims, 4 Drawing Sheets

US 7,620,673 B2

COMPLIMENTARY DISCRETE FOURIER TRANSFORM PROCESSOR

PRIORITY CLAIM UNDER 35 U.S.C. §119(e)

This patent application claims the priority benefit of the filing date of provisional application Ser. No. 60/722,081, having been filed in the United States Patent and Trademark Office on Sep. 19, 2005 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

1. Technical Field of the Invention

This invention relates generally to the field of signal analysis and synthesis whereby electronic signals are decomposed into independent frequency components, processed, and reconstituted. The invention relates more specifically to signal analysis methods and means which minimize the undesired products or "artifacts" of aforesaid signal analysis and synthesis.

The acquisition of an analog signal often results in a digital sequence, x(n), that contains not only the signal of interest, but also other signals of interest, and/or additive distortion. In the case that the lower band of frequencies are retained, the sequence can be low-pass filtered by a filter h(n) as $$y_l(n) = x(n) * h(n), \quad (1)$$

where the * symbol represents convolution. Subsequently the result is decimated by M to form $$y_{ld}(n) \equiv y_l(m), m = n_o + nM \quad (2)$$

with n, and M integers. The offset, $n_o$, is an arbitrary integer value between 0 and M−1 inclusive. It is assumed that M>1 is chosen together with the low-pass cut-off frequency, to achieve an acceptable maximum level of aliasing distortion, while simultaneously minimizing the output sample rate.

The offset, $n_o$, is not normally an accessible parameter. Thus the notion of multiple phases associated with the resulting output sampling; i.e, the set of possible outputs represents a poly-phase system. In this example there exist M possible outcomes of the low-pass filter and decimation system. When one additionally considers the use of finite-impulse-response (FIR) filters, it can be easily shown that alternatively, the decimation can occur before the filtering to achieve the same result. Computationally this is very important, especially when only 1 of the M output channels of a particular sample phase, is needed. This concept is extended by the poly-phase filter bank, to allow for computationally efficient frequency channelization. Such poly-phase architectures inherently translate the frequency response of the low-pass filter prototype, h(n). This results in the desired M-channel filter bank.

2. Prior Art

A Discrete Fourier Transform poly-phase filter architecture is presented in FIG. 1. This particular architecture is referred to as the Modified DFT (MDFT) filter bank [1] and is representative of the prior state-of-the-art. The MDFT filter bank combines the key characteristics of DFT filter banks of linear phase analysis and synthesis filters, efficient realization and inherent alias cancellation for near perfect reconstruction. A particular disadvantage of this and related prior art techniques, however, is the need to maintain signal fidelity between the IDFT and DFT operations, shown as dashed lines in the figure. Fidelity is required to maintain alias cancellation. This precludes the use of such prior art MDFT filter banks in certain equalization and data compression applications. Another disadvantage of the prior art is the additional computational complexity shown between the IDFT and DFT operations, which include multiplications and selection of real (Re) and imaginary (Im) signal components.

OBJECTS AND SUMMARY OF THE INVENTION

The present invention provides a method and apparatus for channelization, analysis and synthesis of discrete signals.

It is therefore an object of the present invention to provide a method and apparatus for phase linearity across a process for the channelization, analysis and synthesis of discrete signals.

It is a further object of the present invention to provide a method and apparatus for computational efficiency to the channelization, analysis and synthesis processing of discrete signals.

It is still a further object of the present invention to provide a method and apparatus for near perfect signal reconstruction of discrete signals which have been channelized, analyzed and synthesized.

It is yet still a further object of the present invention to provide a method and apparatus for processing real and complex valued input signals.

An additional object of the present invention is to overcome a lack of signal fidelity which has the undesired effect of precluding complete alias cancellation in prior art discrete Fourier transformer (DFT) filter banks employing DFT and inverse DFT operations.

Briefly stated, the present invention achieves these and other objects through method and apparatus for a complimentary discrete Fourier transform processor. An input signal is sampled, samples then being sequentially delayed, channelized, and processed. Synthesized outputs are provided in complimentary form. Channels are independent so as to allow for the application of gain, equalization and interference cancellation on a channel-by-channel basis. Both real and complex valued input signals may be processed. The invention optimizes computational efficiency.

In the fundamental method embodiment of the present invention, method for complimentary discrete Fourier transform processing, comprises performing an analysis processing step on a discrete signal x(n) so as to produce M intermediate outputs being incrementally delayed relative to each other by a prescribed amount; performing a first synthesis processing step on the M intermediate outputs; in parallel with said first synthesis processing step, applying gain to each of the M intermediate outputs so as to produce M amplified intermediate outputs, and performing a second synthesis processing step thereon so as to produce an output $y_m(n)$; negating the output of the first synthesis processing step; summing the negated output of the first synthesis processing step with a delayed version of signal x(n) so as to form a residue; performing a complimentary analysis processing step on the residue output so as to produce M complimentary intermediate outputs; and applying gain to each of the M complimentary intermediate outputs so as to produce M amplified complimentary intermediate outputs and performing a complimentary synthesis processing step thereon, so as to produce a complimentary output $y_c(n)$; and delaying output $y_m(n)$ by an integer delay of (L–M), so as to align $y_m(n)$ with complimentary output $y_c(n)$; and summing $y_m(n)$ and $y_c(n)$ so as to reconstruct the signal $x(n)$.

According to an apparatus embodiment of the present invention, apparatus for a complimentary discrete Fourier transform processor, comprises an analysis processor and a complimentary analysis processor both having M channels; M–1 delay elements, one each being connected between the inputs of adjacent channels; M down samplers, the input of the first down sampler being connected to the input of the analysis processor; and the input of (M–1) successive down samplers being connected to the output of the delay element corresponding to that channel; M low-pass filters, the input of which is connected to the output of the down sampler; and a first M-point inverse discrete Fourier transformer having M inputs, each input being connected to the output of corresponding low-pass filter in that channel.

Still according to an apparatus embodiment of the present invention, apparatus for a complimentary discrete Fourier transform processor, comprises two synthesis processors and one complimentary synthesis processor each having a first M-point discrete Fourier transformer having M inputs, each input being connected to the corresponding outputs of the first M-point inverse discrete Fourier transformer; M channels, each channel corresponding to an output of the first M-point discrete Fourier transformer; M low-pass filters, one each being in and corresponding to one of the M channels, wherein the input of the low-pass filter is connected to that output of the first M-point discrete Fourier transformer corresponding to the channel; M up selectors, one each being in and corresponding to one of the M channels, the input of which is connected to the output of the low-pass filter corresponding to the channel; M–1 delay element/summer pairs, each pair being connected between the adjacent outputs of the up selectors, wherein the output of first adjacent up selector is connected to the input of the delay element; the output of the delay element is connected to the first input of the summer; the output of second adjacent up selector is connected to the second input of the summer; and where the output of the $(M-1)^{th}$ summer is connected to the output of the first synthesis processor.

In contrast to and in improvement upon prior art devices, the present invention produces discrete signal processing and synthesis without aliasing and at greater processing efficiency.

The above, and other objects, features and advantages of the present invention will become apparent from the following description read in conjunction with the accompanying drawings, in which like reference numerals designate the same elements.

References

[1] Karp, T., Fliege N. J., November 1999. Modified DFT Filter Banks with Perfect Reconstruction. *IEEE Transactions on Circuits and Systems-II: Analog and Digital Signal Processing, Vol.* 46, No. 11.
[2] Noga, A. July 2001. Complex Band-pass Filters for Analytic Signal Generation and their Application. In-House Technical Memorandum, AFRL-IF-RS-TM-2001-1.

DETAILED DESCRIPTION OF THE PREFERRED EMBODIMENT

Figure 1:
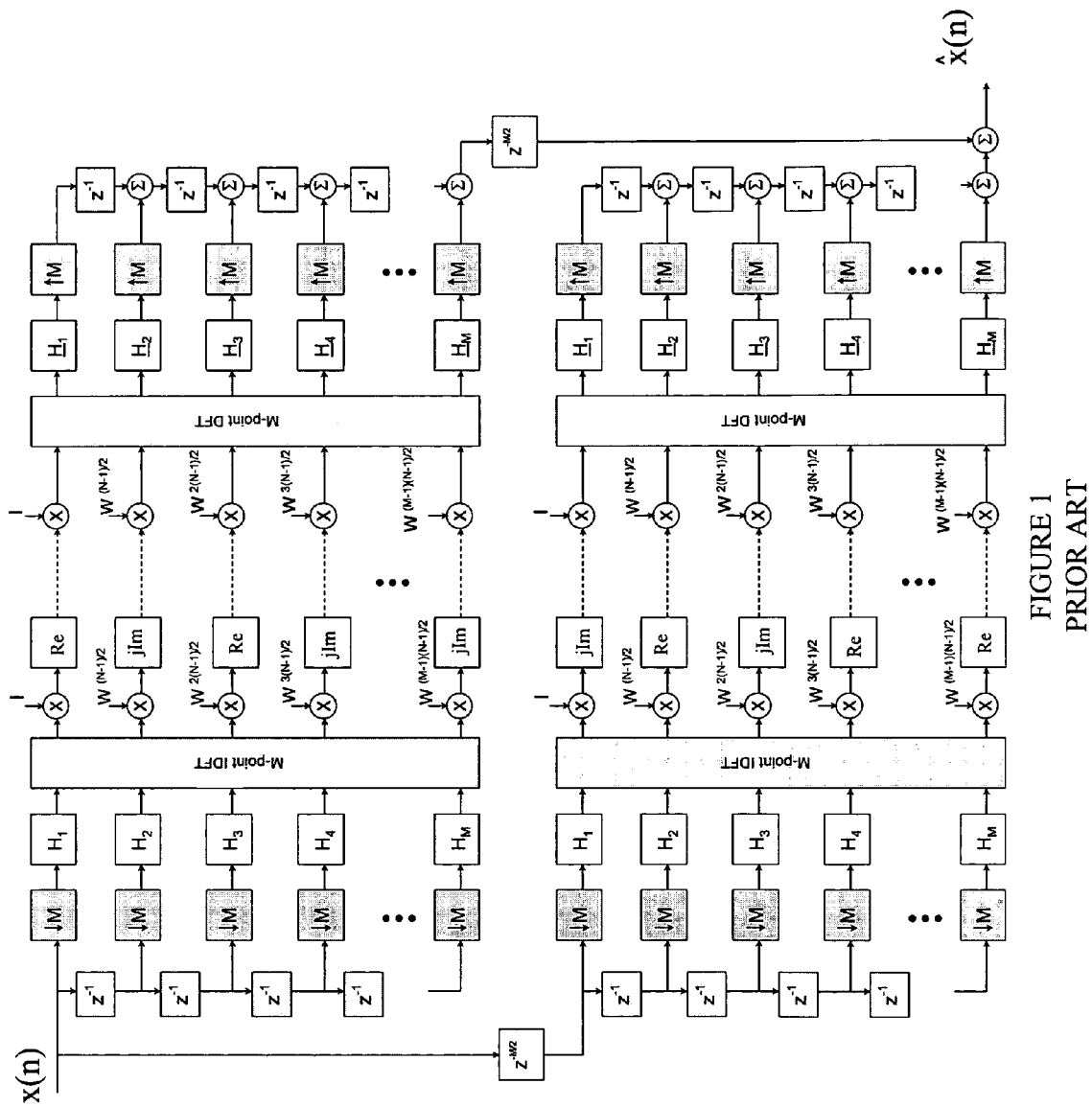
FIG. 1 depicts a schematic diagram representation of the prior art.
Figure 2:
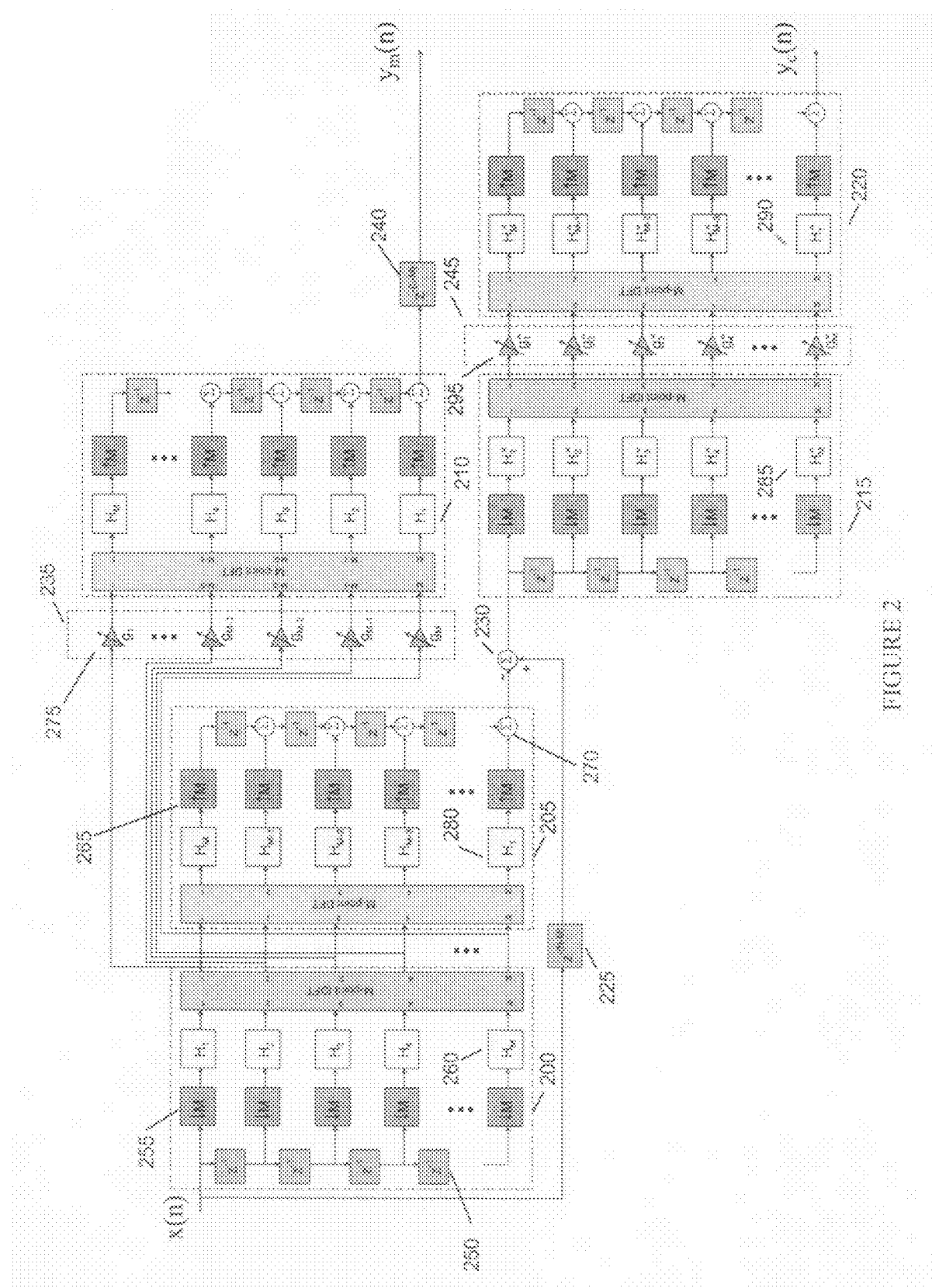
FIG. 2 depicts a schematic diagram of the present invention.

Referring to FIG. 2, a CDFT filter bank of the present invention is depicted. It comprises two DFT filter banks each of M channels, along with an extra synthesis filter bank. The first filter bank is comprised of an analysis processor 200, and a first synthesis processor 205. A second synthesis processor 210 operates on the outputs of the analysis processor 200. The second filter bank is comprised of a complimentary analysis processor 215, and a complimentary synthesis processor 220.

The input signal, $x(n)$, is processed by both the analysis processor 200 and the signal delay element 225. The M outputs of the analysis processor 200 are input to the first synthesis processor 205. By design, analysis processor 200 and first synthesis processor 205 together impart an integer delay of N–M samples relative to the input, $x(n)$. The purpose of delay element 225 is to align the input, $x(n)$, with the processed signal from first synthesis processor 205. The output of first synthesis processor 205 is negated and added in summer 230 to the output of first delay element 225. The output of summer 230 is a residue signal that is input to complimentary analysis processor 215.

First and second gain stages 235 and 245 each comprise M individual gain elements 275 and operate on the M main channels and the M complementary channels respectively. The main channels and the complementary channels together represent the decomposition of the input signal into 2M channels.

The complementary synthesis output, $y_c(n)$, is generated from the residue output of summer 230. The output of summer 230 is processed sequentially by complimentary analysis processor 215, second gain stage 245, and complimentary synthesis processor 220. The output of complimentary synthesis processor 220 is the complementary synthesis output, $y_c(n)$. To form the main synthesis output, $y_m(n)$, the main channels from first gain stage 235 are processed by second synthesis processor 210 and then processed by second delay element 240. Complimentary analysis processor 215, second gain stage 245 and complimentary synthesis processor 220 together impart a processing delay of L–M samples. Therefore, second delay element 240 is needed to impart an L–M sample delay on the output of second synthesis processor 210 to properly align $y_m(n)$ with $y_c(n)$.

In the present invention, the processing result of the CDFT filter bank is the decimation and frequency channelization of the input signal, $x(n)$, at the inverse DFT (IDFT) outputs. These interim outputs can then be processed, frequency rotated and interpolated to achieve signal reconstruction at the output of first synthesis processor 205 and complimentary synthesis processor 220. Various signal processing functions can be performed in first and second gain stages 235 and 245, including encoding and decoding. In the CDFT architecture of the present invention, an important characteristic is the ability to apply an arbitrary gain, $g_k$, to each channel k of the M main channels and an arbitrary gain, $g''_k$, to each channel k of the M complementary channels. This can be useful for interference excision and equalization.

For first analysis processor 200, first synthesis processor 205 and second synthesis processor 210 of the present invention, each analysis low-pass filter 260, $H_l$ through $H_M$ have essentially the same magnitude responses, but have unique phase responses. Each of these FIR filters has N/M taps (coefficients) and are formed from a low-pass filter "prototype" which satisfies aliasing distortion requirements. The prototype filter is chosen as a symmetric FIR filter with N coefficients. An additional characteristic of the CDFT architecture in the present invention is that the synthesis filters are paired in a particular way with the input sample-phased channels.

An important configuration of the present invention to consider is the case where the channel gains, $g_k$, are set to unity. Of interest is the overall response characteristic from the input of first analysis processor 200 to the output of first synthesis processor 205. Because the effects of the IDFT and DFT processes will cancel in an ideal implementation, each filter pair can be combined from an analysis viewpoint. Each sample-phased channel from channel 1 to M, effectively has a single filter between the down-samplers 255 and the up-samplers 265. These composite filters have transfer functions $H_1(z)H_M(z)$, $H_2(z)H_{M-1}(z)$, $H_3(z)H_{M-2}(z)$, ... $H_M(z)H_1(z)$. This leads to a constraint that is placed on these transfer functions, and therefore places a related constraint on the low-pass filter prototype design. Specifically, for the CDFT architecture herein, it is required that each composite transfer function result in the same integer sample delay, (N/M)−1, for each channel for all frequencies. This is accomplished by requiring that the corresponding filter coefficients satisfy particular properties: the coefficients of $h_M$ are the time-reversed conjugate of $h_1$, the coefficients of $h_{M-1}$ are the time-reversed conjugate of $h_2$, etc. This ensures the integer delay of N−M samples across the entire spectrum. In a similar fashion for complimentary analysis processor 215 and complimentary synthesis processor 220, it is required that each composite transfer function result in the same integer sample delay, (L/M)−1, for each channel for all frequencies. This is accomplished by requiring that the corresponding filter coefficients satisfy particular properties: the coefficients of $h''_M$ are the time-reversed conjugate of $h''_1$, the coefficients of $h''_{M-1}$ are the time-reversed conjugate of $h''_2$, etc. This ensures the integer delay of L−M samples across the entire spectrum.

Figure 3:
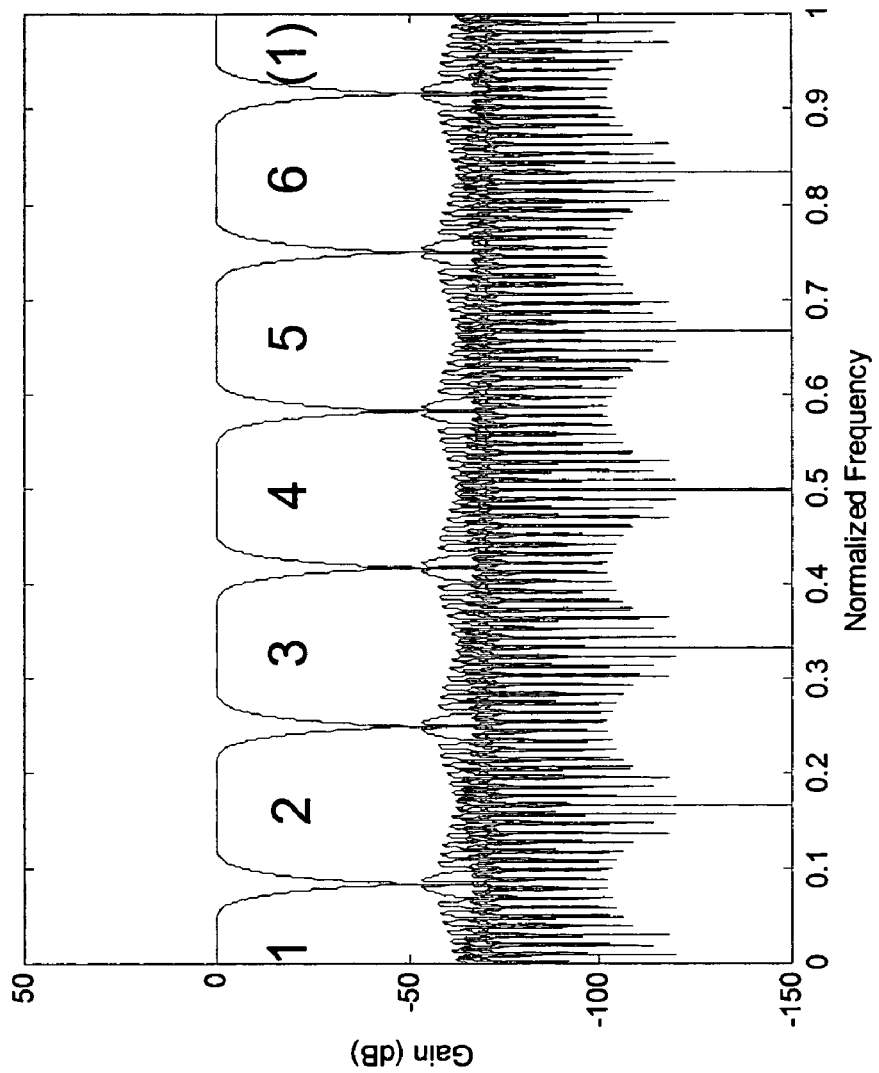
FIG. 3 depicts a graphical output of the magnitude response of the main channels of the present invention.
Figure 4:
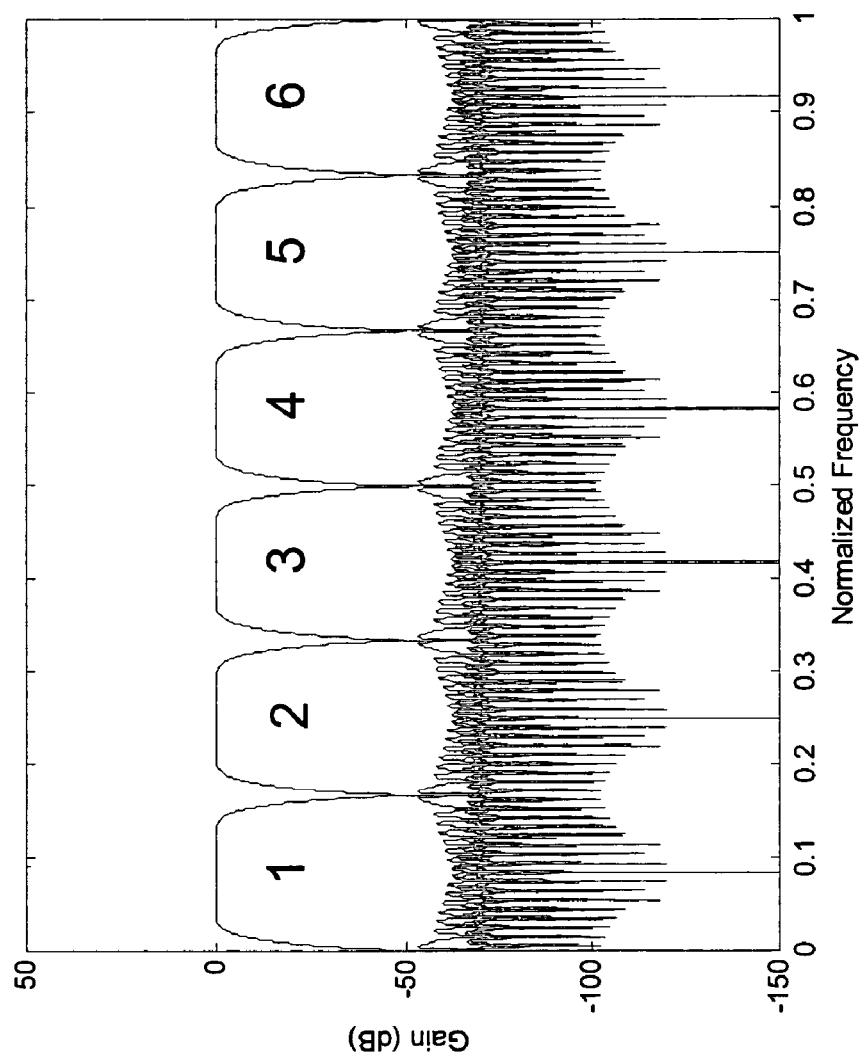
FIG. 4 depicts a graphical output of the magnitude response of the complimentary channels of the present invention.

The (real-valued) prototype low-pass filter coefficients can be obtained for example, from a design routine such as the 'firl' Matlab command. This command returns the numerator coefficients in a vector, b, and the denominator coefficient is the scalar a=1. This is accomplished as >>[b, a]=firl(N−1,w/M);

The relative bandwidth parameter, w, is used to control the amount of overlap between channel frequency responses. (Experimentally, for values of M from 16 to 128, w can be set to about 0.5 to prevent pass-band overlap, while values of about 1.0 achieve overlap near −3 dB.) If so desired, the resulting filter bank response of the CDFT architecture can also be rotated in frequency by simply multiplying the filter coefficients, b, by a complex exponential sequence at the appropriate frequency [2]. Typically, the gain of the prototype filters is set to unity. It should be noted that the CDFT architecture allows for the processing of either real or complex-valued inputs, x(n). A representative 6 channel filter bank response is shown in FIG. 3 and FIG. 4. Note for this example that because frequency rotation was not employed on the prototype filter, the channel 1 response is split equally between low and high frequencies.

Total reconstruction is obtained by summing $y_m(n)$ and $y_c(n)$. To achieve near-perfect reconstruction, the bandwidths of the main and complementary channels must be carefully chosen. The general approach is to create non-overlapping bands in the main channels, and choose bandwidths for the complementary channels that are also non-overlapping, but wide enough to pass the bands rejected by the main channels as shown in FIG. 3. Thus the function of complimentary analysis processor 215, second gain stage 245, and complimentary synthesis processor 220 is to obtain control over the frequencies that are rejected by the main channel. In effect, the complementary CDFT poly-phase filter becomes a 2M channel device, by the proper combination of a pair of M channel filter banks.

Referring to FIG. 3 and FIG. 4, note that the filter orders are high enough to give relatively sharp transition bands. Also note that as seen in FIG. 4, the complementary channels are properly rotated in frequency to pass those frequencies which are rejected in the main channels. Again, this is accomplished by simply shifting the frequency response of the prototype filter for complimentary analysis processor 215 and complimentary synthesis processor 220 (see FIG. 2). This implies that the coefficients of the complementary channel filters are complex-valued. This does not present a problem with the CDFT architecture, nor with the overall complementary filter of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In the field of signal analysis and synthesis, a software program comprising instructions, stored on computer-readable media, wherein said instructions, when executed by a computer, perform the necessary steps for generating a complimentary, discrete Fourier transformation of said signal, said steps further comprising:

performing an analysis processing step on a discrete signal x(n) so as to produce M intermediate outputs being incrementally delayed relative to each other by a prescribed amount;

performing a first synthesis processing step on said M intermediate outputs;

in parallel with said first synthesis processing step, applying gain to each of said M intermediate outputs so as to produce M amplified intermediate outputs, and performing a second synthesis processing step thereon so as to produce an output $y_m(n)$;

negating the output of said first synthesis processing step;

summing said negated output of said first synthesis processing step with a delayed version of said signal x(n) so as to form a residue;

performing a complimentary analysis processing step on said residue output so as to produce M complimentary intermediate outputs; and applying gain to each of said M complimentary intermediate outputs so as to produce M amplified complimentary intermediate outputs and performing a complimentary synthesis processing step thereon, so as to produce a complimentary output $y_c(n)$; and delaying said output $y_m(n)$ by an integer delay so as to align $y_m(n)$ with said complimentary output $y_c(n)$; and summing $y_m(n)$ and $y_c(n)$ so as to reconstruct said signal x(n).

2. The analysis processing step of claim 1, further comprising sequentially sampling said discrete signal x(n) at prescribed intervals;
delaying each sequential sample of said signal, relative to the prior sequential sample, by a period equal to said prescribed interval;
forming M channels each corresponding to and comprising one of said M sequential samples of said delayed signal;
in each of said M channels, selecting every $M^{th}$ sample of said delayed signal;
low-pass filtering each of said M channels; and
performing an inverse discrete Fourier transform on each of said M low-pass filtered channels so as to produce said M intermediate outputs.

3. The first synthesis processing step of claim 1, further comprising
performing a discrete Fourier transform on each of said M intermediate outputs;
forming M channels each corresponding to and comprising one of said M intermediate outputs therein;
low-pass filtering each of said M channels;
in each of said M channels, inserting M−1 samples between every sample of said filtered intermediate output;
combining the output of said M channels by delaying and summing the output of each said channel with the output of the next successive channel until said output of the $(M-1)^{th}$ channel is delayed and summed with said output of the $M^{th}$ channel, so as to produce a first synthesis processing step output.

4. The second synthesis processing step of claim 1, further comprising
performing a discrete Fourier transform on each of said M amplified intermediate outputs;
forming M channels each corresponding to and comprising one of said M amplified intermediate outputs therein;
low-pass filtering each of said M channels;
in each of said M channels, inserting M−1 samples between every sample of said amplified and filtered intermediate outputs;
combining the output of said M channels by delaying and summing the output of each said channel with the output of the next successive channel until said output of the $(M-1)^{th}$ channel is delayed and summed with said output of the $M^{th}$ channel, so as to produce a second synthesis processing step output $y_m(n)$.

5. The complimentary analysis processing step of claim 1, further comprising
sequentially sampling said residue at prescribed intervals;
delaying each sequential sample of said residue, relative to the prior sequential sample, by a period equal to said prescribed interval;
forming M channels each corresponding to and comprising one of said M sequential samples of said delayed residue;
in each of said M channels, selecting every $M^{th}$ sample of said delayed residue;
low-pass filtering each of said M channels; and
performing an inverse discrete Fourier transform on each of said M low-pass filtered channels so as to produce said M complimentary intermediate outputs.

6. The complimentary synthesis processing step of claim 1, further comprising
performing a discrete Fourier transform on each of said M amplified complimentary intermediate outputs;
forming M channels each corresponding to and comprising one of said M amplified complimentary intermediate outputs therein;
low-pass filtering each of said M channels;
in each of said M channels, inserting M−1 samples between every sample of said amplified and filtered complimentary intermediate outputs;
combining the output of said M channels by delaying and summing the output of each said channel with the output of the next successive channel until said output of the (M−1)th channel is delayed and summed with said output of the $M^{th}$ channel, so as to produce a complimentary synthesis processing step output $y_c(n)$.

7. Said step of low-pass filtering of any one of claims 2, 3, 4, 5, or 6 further comprising filtering with a FIR filter having N coefficients;
said step of low-pass filtering in each of said channels in said first and said second synthesis processing steps being the time-reversed conjugate of said step of low-pass filtering in each of said corresponding channels in said analysis processing step; and
said step of low-pass filtering in each of said channels in said complimentary analysis processing steps being the time-reversed conjugate of said step of low-pass filtering in each of said corresponding channels in said complimentary synthesis processing step.

8. A computer apparatus for generating a complimentary, discrete Fourier transform of a signal, comprising:
a computing device; and
a software program residing in said computing device;
wherein said software program comprises instructions, stored on a computer-readable media, and wherein said computing device, upon executing said instructions, provides means to:
analysis process a discrete signal x(n) so as to produce M intermediate outputs being incrementally delayed relative to each other by a prescribed amount;
first synthesis process said M intermediate outputs;
in parallel with said first synthesis processing, apply gain to each of said M intermediate outputs so as to produce M amplified intermediate outputs, and to second synthesis process said M amplified intermediate outputs so as to produce an output $y_m(n)$;
negate the output of said first synthesis processing;
sum said negated output of said first synthesis processing with a delayed version of said signal x(n) so as to form a residue;
complimentary analysis process said residue output so as to produce M complimentary intermediate outputs; and
apply gain to each of said M complimentary intermediate outputs so as to produce M amplified complimentary intermediate outputs and to complimentary synthesis process said M amplified complimentary intermediate outputs so as to produce a complimentary output $y_c(n)$; and
delay said output $y_m(n)$ by an integer delay so as to align $y_m(n)$ with said complimentary output $y_c(n)$ and sum $y_m(n)$ and $y_c(n)$ so as to reconstruct said signal x(n).

9. Said analysis processing means of claim 8, further comprising means to
sequentially sample said discrete signal x(n) at prescribed intervals;
delay each sequential sample of said signal, relative to the prior sequential sample, by a period equal to said prescribed interval;
form M channels each corresponding to and comprising one of said M sequential samples of said delayed signal;
in each of said M channels, select every $M^{th}$ sample of said delayed signal;
low-pass filter each of said M channels; and perform an inverse discrete Fourier transform on each of said M low-pass filtered channels so as to produce said M intermediate outputs.

10. Said first synthesis processing means of claim 8 further comprising means to
perform a discrete Fourier transform on each of said M intermediate outputs;
form M channels each corresponding to and comprising one of said M intermediate outputs therein;
low-pass filter each of said M channels;
in each of said M channels, insert M−1 samples between every sample of said filtered intermediate output;
combine the output of said M channels by delaying and summing the output of each said channel with the output of the next successive channel until said output of the $(M-1)^{th}$ channel is delayed and summed with said output of the $M^{th}$ channel, so as to produce a first synthesis processing output.

11. Said second synthesis processing means of claim 8, further comprising means to
perform a discrete Fourier transform on each of said M amplified intermediate outputs;
form M channels each corresponding to and comprising one of said M amplified intermediate outputs therein;
low-pass filter each of said M channels;
in each of said M channels, insert M−1 samples between every sample of said amplified and filtered intermediate outputs;
combine the output of said M channels by delaying and summing the output of each said channel with the output of the next successive channel until said output of the $(M-1)^{th}$ channel is delayed and summed with said output of the Mth channel, so as to produce a second synthesis processing output $y_m(n)$.

12. Said complimentary analysis processing means of claim 8, further comprising means to
sequentially sample said residue at prescribed intervals;
delay each sequential sample of said residue, relative to the prior sequential sample, by a period equal to said prescribed interval;
form M channels each corresponding to and comprising one of said M sequential samples of said delayed residue;
in each of said M channels, select every $M^{th}$ sample of said delayed residue;
low-pass filter each of said M channels; and
perform an inverse discrete Fourier transform on each of said M low-pass filtered channels so as to produce said M complimentary intermediate outputs.

13. Said complimentary synthesis processing means of claim 8, further comprising means to
perform a discrete Fourier transform on each of said M amplified complimentary intermediate outputs;
form M channels each corresponding to and comprising one of said M amplified complimentary intermediate outputs therein;
low-pass filter each of said M channels;
in each of said M channels, insert M−1 samples between every sample of said amplified and filtered complimentary intermediate outputs;
combine the output of said M channels by delaying and summing the output of each said channel with the output of the next successive channel until said output of the $(M-1)^{th}$ channel is delayed and summed with said output of the $M^{th}$ channel, so as to produce a complimentary synthesis processing output $y_c(n)$.

14. Said low-pass filter means of any one of claims 9, 10, 11, 12, or 13 being a FIR filter having N coefficients and
said low-pass filter means in each of said channels in said first and said second synthesis processing being the time-reversed conjugate of said low-pass filter means in each of said corresponding channels in said analysis processing; and
said low-pass filter means in each of said channels in said complimentary analysis processing being the time-reversed conjugate of said low-pass filter means in each of said corresponding channels in said complimentary synthesis processing.

15. A complimentary discrete Fourier transform filter bank comprising:
an analysis processor into which is input a discrete signal x(n);
a first synthesis processor, the input of which is connected to the output of said analysis processor;
a first gain stage, the input of which is connected to the output of said analysis processor;
a second synthesis processor, the input of which is connected to the output of said first gain stage;
a first delay element into which is input a sample of said discrete signal x(n) and from which is output a delayed version of x(n), being delayed by an integer delay so as to align said delayed version of x(n) with the output of said first synthesis processor;
a summer,
the first input of which is connected to the output of said first synthesis processor, said first input further negating said output of said first synthesis processor;
the second input of which is connected to the output of said first delay element; and
wherein said summer produces a residue at its output;
a complimentary analysis processor, the input of which is connected to the output of said summer;
a second gain stage, the input of which is connected to the output of said complimentary analysis processor;
a complimentary synthesis processor, the input of which is connected to the output of said second gain stage, and the output of which produces a complimentary output $y_c(n)$;
a second delay element, the input of which is connected to the output of said complimentary synthesis processor and the output of which produces a delayed version of output $y_m(n)$ so as to align $y_m(n)$ with $y_c(n)$.

16. Said analysis processor of claim 15, further comprising
M channels;
M−1 delay elements, one each being connected between the inputs of adjacent said channels;
M down samplers,
the input of first said down sampler being connected to said input of said analysis processor; and
the input of (M−1) successive said down samplers being connected to the output of said delay element corresponding to that channel;
M low-pass filters, the input of which is connected to the output of said down sampler; and
a first M-point inverse discrete Fourier transformer having M inputs, each said input being connected to the output of said corresponding low-pass filter in that channel.

17. Said first synthesis processor of claim 16, further comprising
a first M-point discrete Fourier transformer having M inputs, each said input being connected to the corresponding outputs of said first M-point inverse discrete Fourier transformer;

M channels, each said channel corresponding to an output of said first M-point discrete Fourier transformer;

M low-pass filters, one each being in and corresponding to one of said M channels, wherein the input of said low-pass filter is connected to that output of said first M-point discrete Fourier transformer corresponding to said channel;

M up samplers, one each being in and corresponding to one of said M channels, the input of which is connected to the output of said low-pass filter corresponding to said channel;

M−1 delay element/summer pairs, each said pair being connected between the adjacent outputs of said up samplers, wherein the output of first adjacent up sampler is connected to the input of said delay element;

the output of said delay element is connected to the first input of said summer;

the output of second adjacent up sampler is connected to the second input of said summer; and where the output of the $(M-1)^{th}$ summer is connected to the output of said first synthesis processor.

18. Said first gain stage of claim 16, further comprising M gain elements, one each corresponding to each of said M channels.

19. Said second synthesis processor of claim 18, further comprising a second M-point discrete Fourier transformer having M inputs, each said input being connected to the corresponding outputs of each of said M gain elements;

M channels, each said channel corresponding to an output of said second M-point discrete Fourier transformer;

M low-pass filters, one each being in and corresponding to one of said M channels, wherein the input of said low-pass filter is connected to that output of said first M-point discrete Fourier transformer corresponding to said channel;

M up selectors, one each being in and corresponding to one of said M channels, the input of which is connected to the output of said low-pass filter corresponding to said channel;

M−1 delay element/summer pairs, each said pair being connected between the adjacent outputs of said up selectors, wherein the output of first adjacent up selector is connected to the input of said delay element;

the output of said delay element is connected to the first input of said summer;

the output of second adjacent up selector is connected to the second input of said summer; and where the output of the $(M-1)^{th}$ summer is connected to the output of said second synthesis processor.

20. Said complimentary analysis processor of claim 15, further comprising

M channels;

M−1 delay elements, one each being connected between the inputs of adjacent said channels;

M down samplers, the input of first said down sampler being connected to said input of said analysis processor; and the input of (M−1) successive said down samplers being connected to the output of said delay element corresponding to that channel;

M low-pass filters, the input of which is connected to the output of said down sampler; and a second M-point inverse discrete Fourier transformer having M inputs, each said input being connected to the output of said corresponding low-pass filter in that channel.

21. Said second gain stage of claim 20, further comprising M gain elements, one each corresponding to each of said M channels.

22. Said complimentary synthesis processor of claim 21, further comprising a third M-point discrete Fourier transformer having M inputs, each said input being connected to the corresponding outputs of said second gain stage;

M channels, each said channel corresponding to an output of said third M-point discrete Fourier transformer;

M low-pass filters, one each being in and corresponding to one of said M channels, wherein the input of said low-pass filter is connected to that output of said third M-point discrete Fourier transformer corresponding to said channel;

M up selectors, one each being in and corresponding to one of said M channels, the input of which is connected to the output of said low-pass filter corresponding to said channel;

M−1 delay element/summer pairs, each said pair being connected between the adjacent outputs of said up selectors, wherein the output of first adjacent up selector is connected to the input of said delay element;

the output of said delay element is connected to the first input of said summer;

the output of second adjacent up selector is connected to the second input of said summer; and where the output of the $(M-1)^{th}$ summer is connected to the output of said complimentary synthesis processor.

23. Said low-pass filter of any one of claims 16, 17, 19, 20, or 22 being a FIR filter having N coefficients and said low-pass filter in each of said channels in said first and said second synthesis processor being the time-reversed conjugate of said low-pass filter in each of said corresponding channels in said analysis processor; and said low-pass filter in each of said channels in said complimentary analysis processor being the time-reversed conjugate of said low-pass filter in each of said corresponding channels in said complimentary synthesis processor.

* * * * *